April 9, 1963 C. E. MOORE 3,085,241
TRUE-MOTION RADAR DISPLAY SYSTEM
Filed Dec. 24, 1958 7 Sheets-Sheet 1

INVENTOR.
CHARLES E. MOORE
BY
ATTORNEY

April 9, 1963 C. E. MOORE 3,085,241
TRUE-MOTION RADAR DISPLAY SYSTEM
Filed Dec. 24, 1958 7 Sheets-Sheet 2

INVENTOR.
CHARLES E. MOORE
BY
ATTORNEY

April 9, 1963 C. E. MOORE 3,085,241
TRUE-MOTION RADAR DISPLAY SYSTEM
Filed Dec. 24, 1958 7 Sheets-Sheet 3

INVENTOR.
CHARLES E. MOORE
BY
ATTORNEY

April 9, 1963  C. E. MOORE  3,085,241
TRUE-MOTION RADAR DISPLAY SYSTEM
Filed Dec. 24, 1958  7 Sheets-Sheet 4

Fig. 9.

INVENTOR.
CHARLES E. MOORE
BY
ATTORNEY

April 9, 1963  C. E. MOORE  3,085,241
TRUE-MOTION RADAR DISPLAY SYSTEM
Filed Dec. 24, 1958  7 Sheets-Sheet 5

INVENTOR.
CHARLES E. MOORE
BY
ATTORNEY

INVENTOR.
CHARLES E. MOORE
BY
ATTORNEY

April 9, 1963 C. E. MOORE 3,085,241
TRUE-MOTION RADAR DISPLAY SYSTEM
Filed Dec. 24, 1958 7 Sheets-Sheet 7

INVENTOR.
CHARLES E. MOORE
BY
ATTORNEY 3,085,241
TRUE-MOTION RADAR DISPLAY SYSTEM
Charles E. Moore, Bellmawr, N.J., assignor to Radio Corporation of America, a corporation of Delaware
Filed Dec. 24, 1958, Ser. No. 782,936
12 Claims. (Cl. 343—5)

This invention relates to radar and particularly to an improved true-motion radar system.

In a conventional PPI (Plan Position Indicator) radar system, one's own position is always at the center of the cathode ray tube indicator screen. If the vehicle (ship or aircraft) on which the radar system is located moves, both fixed and moving targets appear to move. When the vehicle turns or yaws, the displayed image blurs or smears due to the persistence of the indicator screen. Bearings read from the display are "relative," that is, relative to one's heading which is always up on the PPI screen.

In a "north-stabilized" PPI radar system, the electron beam deflection voltages for the indicator are synchronized with the vehicle's compass. This stabilizes the display with respect to a geographical reference thereby preventing smearing. Targets such as fixed land masses do not change their positions as the vehicle turns; instead, they remain stationary. Bearings read from this north-stabilized presentation are "true" and a source of confusion to the inexperienced operator. If own vehicle is heading south, for example, and the top of the presentation represents north, a target ahead appears at the bottom rather than at the top of the screen and the one on the left appears at the right of the screen.

In a "true-motion" radar display, fixed targets remain in fixed positions and moving targets move. Since the radar system is mounted on a moving vehicle, one's own position on the PPI display also moves. True-motion may be added to the north-stabilized PPI radar system described above by applying beam deflecting voltages to the indicator of the correct magnitude and sense to move one's own position across the indicator screen at a speed proportional to the speed of own vehicle and in the appropriate direction. However, the presentation is still true rather than relative and is confusing for reasons given above. If, on the other hand, true-motion were added to a conventional relative-bearing display, it would not be possible to eliminate the smearing described above.

A general object of the present invention is to provide a stabilized display in which there is no smearing and in which one's own indication always moves up or dead ahead.

Another object of the invention is to provide an automatic reset mechanism for a true-motion radar system in which own vehicle's position is reset to a point on the radar screen such that, if own vehicle continues to travel in the same direction, it will pass through the center of the screen.

Still another object of the invention is to provide an improved system for producing true-motion.

Another object of the invention is to provide a circuit for eliminating from a true-motion display errors and smearing due to winds, currents or the like at an angle to the vehicle's heading.

The display system of the present invention is a north-stabilized, true-motion display. The cathode ray tube and its associated components, however, are rotatable and are driven in accordance with a directional reference (north-stabilized). As will be shown in detail later, north-stabilizing the picture eliminates smearing. North-stabilizing the rotatable tube causes the stabilized picture to rotate to a position such that the display of all targets is relative, i.e., relative to the vehicle course of travel, direction of movement on the indicator screen always being "up." The rotation of the tube cannot introduce any smearing since the beam deflecting means moves with the tube and there is no relative movement between the persistent screen and the electron beam due to the tube rotation.

In a preferred form of the invention, a gyro-operated motor and a motor driven at a speed proportional to own vehicle's speed control the true-motion deflecting voltages. These are indicative of the $x$ and $y$ coordinates of own vehicle's position. The reset mechanism senses when $x^2+y^2$ reaches a preset value such that own vehicle's position is a preset distance from the center of the screen. At that time it automatically resets own vehicle's position across the cathode ray tube to another preselected radius such that if own vehicle continues to travel in the same direction, it will pass through the center of the screen.

Another feature of the invention is a drift compensation circuit which alters the deflection voltages by amounts proportional to the difference between the vehicle's ground track and heading. The adjustment is such that smearing of fixed targets in a direction having a component perpendicular to the ship's heading is eliminated.

The above and other important aspects of the present invention are illustrated in the drawings listed below and explained in greater detail in the description following the drawing list.

FIG. 5 is a schematic showing a ball and disk integrator which may be used in the system of FIG. 4;

FIGS. 6a–6b are plane and side views respectively of the reset mechanism shown in block form in FIG. 4;

FIG. 7 is a schematic showing of the radar console in which the relative-bearing, true-motion display of the present invention is mounted;

FIGS. 8b and 8c are sketches to explain the operation of the circuit of FIG. 8a.

It will be assumed for the purposes of the present explanation that a radar system is mounted on a ship. The ship is initially traveling south and wishes to turn west between two buoys into a harbor entrance between two land masses.

Figures 1A, 2A, 3A:
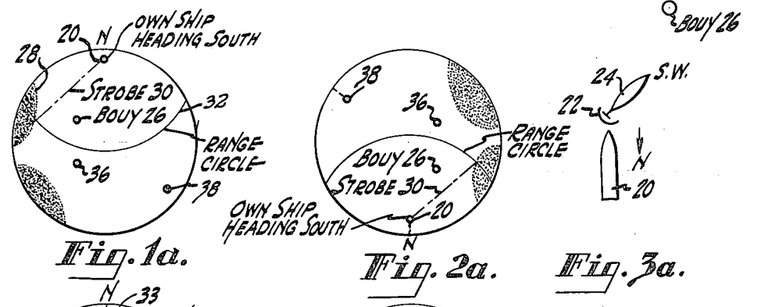
FIGS. 1a–1d are drawings of a prior-art, north-stabilized (true-bearing), true-motion display.
FIGS. 2a–2d are corresponding drawings of a relative-bearing, true-motion display according to the present invention.
FIGS. 3a–3d are corresponding sketches of the vessel carrying the true-motion radar system showing the vessel's position, the position of the directive radar beam, and the position of one fixed target.

Referring first to FIG. 3a, the ship is shown schematically at 20. It is carrying a radar system the antenna of which is shown at 22. The antenna produces a directive beam 24 which is continuously swept in azimuth. At the instant shown in FIG. 3a, the antenna beam 24 is approximately 45° to the right of ship's heading. The angle between the directive beam and the ship's heading is the same for the subsequent FIGS. 3b, 3c and 3d.

Figures 1D, 2D, 3D:
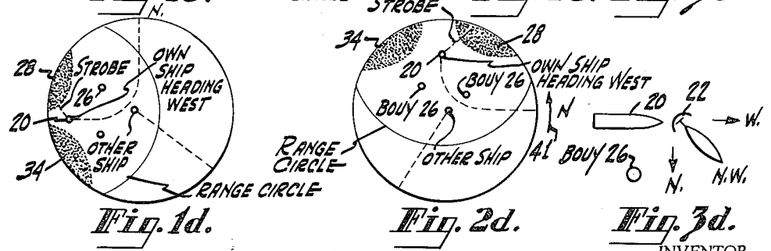
Figures 2C, 3C:
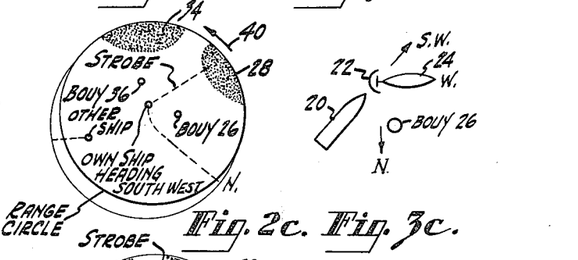
Figure 3B:
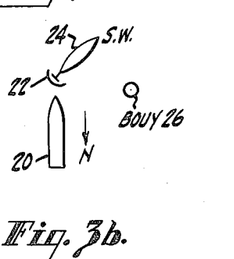

FIG. 3a shows that the ship is approaching a buoy 26 which is at a relative bearing of roughly 40°. FIG. 3b shows the position of ship 20 some time later. It is still proceeding south but now has almost come up to buoy 26. Some time later, as shown in FIG. 3c, ship 20 has passed buoy 26 and has begun to turn into the channel to the harbor. The ship's heading is now approximately southwest. In FIG. 3d the ship is shown heading west and proceeding into the harbor.

The conventional north-stabilized (true-bearing) display of the ship's travel is shown in FIGS. 1a–1d. Own ship's position is shown at 20 near the top of the indicator screen. It is proceeding toward the bottom of the screen as it is moving south. The buoy is shown at 26. A land mass at one side of the harbor entrance is shown at 28. The strobe line 30 is indicative of the direction in which the antenna beam 24 is pointing at that moment. The circle 32 shown is a range circle.

Figure 1B:
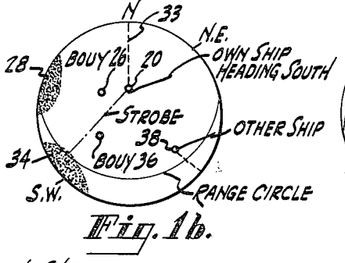

In FIG. 1b, own ship 20 is still proceeding south. The dashed line 33 does not actually appear on the display but is shown here to indicate the path traveled by the ship. In a practical system, a tail appears at the end of own ship's position due to the persistence of the phosphor of which the indicator screen is made. The objects now in view within the range circle include a second land mass 34, another buoy 36, and another ship 38. It will be seen that some experience is required to interpret the displays of FIGS. 1a and 1b. Note that the buoy 26 is actually to the right as shown in FIG. 3b whereas the display of FIG. 1b shows the buoy at the left of the screen. Note also that although the antenna beam is actually pointing at approximately 45° to the ship's heading, the strobe line in FIG. 1b is pointing toward the lower left corner of the indicator screen.

Figure 1C:
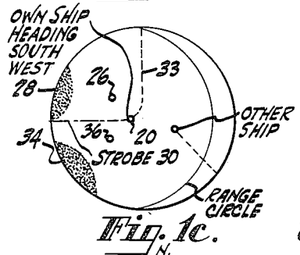

FIG. 1c shows the ship in about the middle of its turn. It is now heading southwest. If the display of FIG. 1c were conventional, relative-bearing display, when own ship turned, the position of land masses 28 and 34 would appear to move with respect to own ship's position and there would be smearing due to the screen persistence. However, the display of FIG. 1c is north-stabilized. This means that voltages derived from a directional reference, such as a gyroscopically controlled step-by-step motor, have been added to the deflection voltages in the proper sense and amount to prevent land masses 28 and 34, for example, from changing position during the ship's turn. These remain absolutely stable on the indicator screen and thereby preserve the quality of the map like presentation. Since the same portion of the phosphor screen is energized by the electron beam during the turn as before the turn, there cannot be any smearing.

The display of FIG. 1d shows own ship proceeding into the harbor. It is now heading west. Referring to FIG. 3d for a moment, the ship 20 has completed a right turn and heading at a relative bearing of 90° from its former bearing of FIG. 3a. The turn to the right is accurately shown in FIG. 1d. However, to the inexperienced observer the display may be confusing. The ship is shown entering a harbor which is at the left of the indicator screen whereas the harbor is actually to the right of the observer's original position (see FIGS. 3a or 3b).

The display system of the present invention is shown in FIGS. 2a–2d. The display is north-stabilized. However, the initial phasing between the antenna beam 24 and the strobe line 30 on the indicator screen is such that targets are shown at their correct relative bearings. Also, the ship's movement is shown in a manner which is least confusing to the operator. Thus, ship 20 is traveling forward and it appears on the indicator screen to be traveling forward and it appears on the indicator screen to be traveling toward the top of the screen. The buoy is ahead of the ship and at an angle of about 40° and is so shown on the indicator screen. The antenna beam is at a relative bearing of about 45° and is so shown in the indicator screen.

Figure 2B:
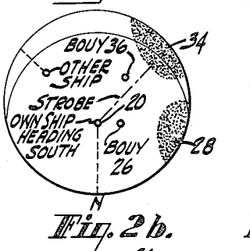

The display of FIG. 2b continues to show all objects at their proper relative bearings. Thus, the land masses 28 and 34, which are actually to the right of the ship, are shown on the indicator screen to be to the right of the ship. The buoy 26 which is at the right of the ship is also shown to the right of the ship. It should be noted that FIGS. 2a and 2b are identical to FIGS. 1a and 1b except that the pictures are rotated through an angle of 180°. It must be emphasized that FIGS. 1a and 1b as well as FIGS. 2a and 2b are north-stabilized displays. In FIGS. 1a and 1b, north is at the top of the indicator screen whereas in FIGS. 2a and 2b north is at the bottom of the indicator screen and takes a new azimuth position for any change in course.

As shown in FIG. 3c, the ship has turned and is now heading southwest. According to the present invention, the cathode ray tube and its deflection coils are all mounted in a rotatable drum and the drum is driven in accordance with the same directional reference used to stabilize the display. Thus, when, ship 20 turns to the right, the drum in which the cathode ray tube is mounted turns to the left and through the same angle, as indicated schematically by arrow 40. The rotation of the tube does not cause any smearing because all of the deflection circuits associated with the tube turn with it. In other words, the picture remains north-stabilized but is merely physically rotated. It is as if the rotatable drum were mounted on a compass needle and turned with the needle.

As shown in FIG. 2c, the resultant display is a relative-bearing display. Own ship 20 always is heading toward the top of the screen. The directive beam 24 is shown in FIG. 3c pointing at an angle of approximately 45° to the ship's heading. The strobe line 30 on the screen is shown at 45° to the ship's heading. The buoy 26 is at a relative bearing of approximately 90° to own ship 20 and is properly shown in FIG. 2c. Note in this connection the more confusing display of the same buoy under the same circumstances shown in FIG. 1c.

When the ship turns an additional 45° and is then heading west into the harbor entrance, the resultant display is as shown in FIG. 2d. The additional 45° right (clockwise) turn by ship 20 has resulted in a 45° counter-clockwise turn of the drum in which the tube is located, as indicated schematically by arrow 41. Own ship's spot 20 continues to move toward the top of the tube. All targets, both fixed and moving, are shown at their proper relative bearings. All smearing has been eliminated.

Figure 4:
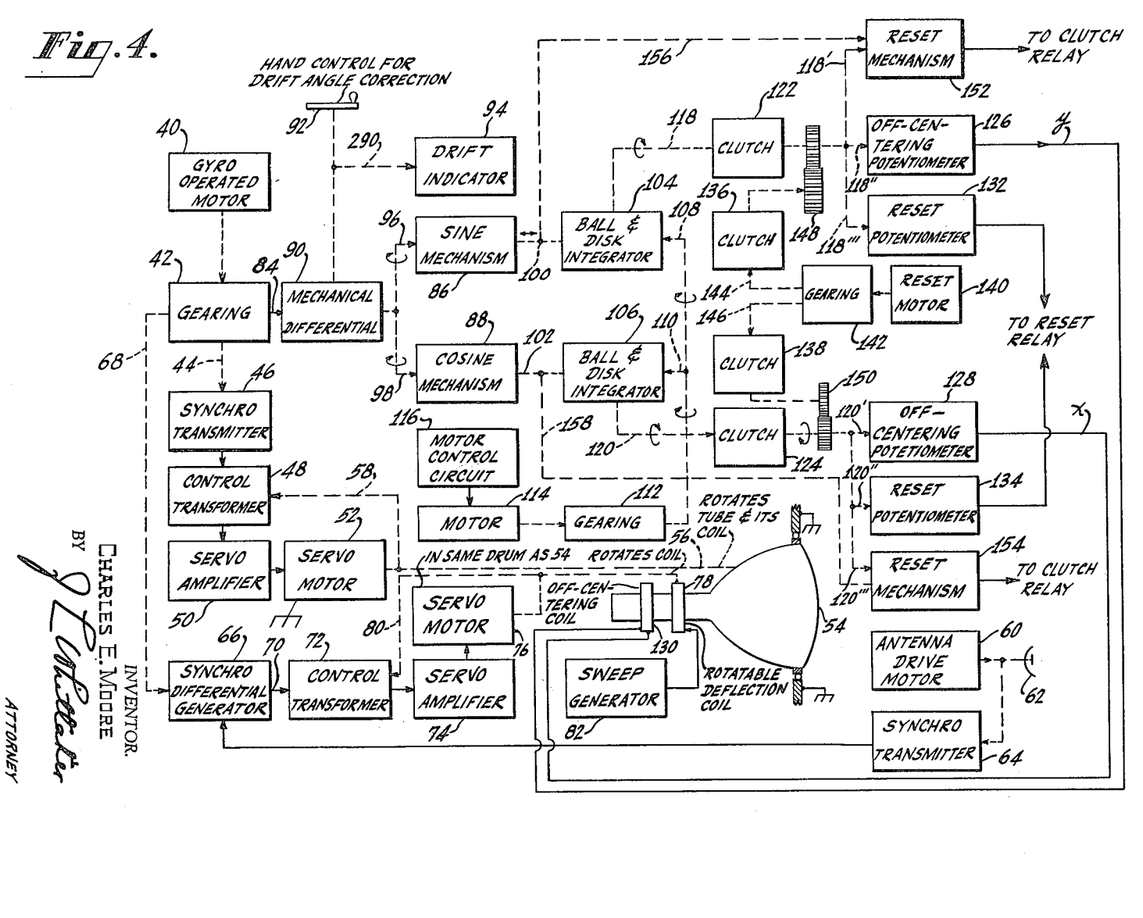
FIG. 4 is a block circuit diagram of a preferred form of a radar system according to the present invention.

The means for achieving the true-motion, relative-bearing display illustrated in FIGS. 2a–2d is shown in block form in FIG. 4. Motor 40, which may be of the step-by-step or continuous type, is gyro operated and drives gearing 42. The function of this motor is to produce a shaft rotation which is proportional to the bearing of the ship on which the radar system is mounted. The output shaft 44 of gearing 42 drives a synchro transmitter 46 which, in turn, applies an electrical signal to control transformer 48. (It might be mentioned here that throughout the drawing a single solid line lead may be indicative of one or more electrical leads. Dashed lines are used to indicate mechanical connections.) The output signal of control transformer 48 has a magnitude which is indicative of the ship's bearing. This signal is amplified by servo amplifier 50 to a power level sufficient to drive servo motor 52. The latter drives the rotatable drum in which the cathode ray tube 54 and its deflection coils and associated circuits are mounted. This is indicated schematically by the dashed line 56 extending to the tube envelope. The servo loop is closed by the mechanical connection 58 to the rotor of the control transformer.

The circuit for producing a north-stabilized picture starts at the lower right of FIG. 4. A motor 60 drives the directional antenna 62 and the synchro transmitter 64. The electrical signal applied by the synchro transmitter 64 to the synchro differential generator 66 has a phase indicative of the antenna direction. The second input to the synchro differential generator 66 is a mechanical input which is indicative of the compass heading. This input is taken from the gearing 42 driven by the gyro operated motor and is indicated schematically by the dashed line 68. The electrical signal available at lead 70 at the output of the synchro differential generator is applied through control transformer 72 to servo amplifier 74. The latter amplifies the signal to a power level sufficient to drive servo motor 76. The servo motor drives the rotatable deflection coil 78 of the cathode ray tube indicator 54. The servo loop is closed by the mechanical connection 80 from the servo motor back to the rotor of the control transformer 72.

The second input to the rotatable deflection coil is the sweep voltage from sweep generator 82. As is understood, the range sweeps produced by the generator 82 are synchronized with the pulses transmitted by the radar antenna 62. These circuits and other radar circuits not essential to the understanding of the present invention are not illustrated or explained, as they are well known in the art.

In the practical design of the present radar system, the cathode ray tube 54 and its deflection coils are mounted in a rotatable drum. The servo motor 76 which rotates the deflection coil 78 is mounted in the same drum and rotates with the drum. The connections between the servo amplifier 74 and servo motor 76 and between other circuits leading to the drum may be by slip rings or other conventional means. Thus, for example, it may be convenient to mount the sweep generator in the drum and to apply the sweep triggering pulses via slip rings.

Returning to the upper left of FIG. 4, the gearing 42 produces a shaft rotation at 84 proportional to the ship's bearing. Shaft 84 drives the sine and cosine mechanisms 86 and 88 through mechanical differential 90. As will be explained in greater detail later, the purpose of the mechanical differential 90 is to introduce a correction to the movement of own ship's position on the indicator screen to compensate for the component of drift at right angles to the direction of ship's motion. The hand wheel 92 is the manual control for the drift angle correction and the drift indicator 94 may be a meter or the like which shows the amount of drift correction which has been introduced into the system.

The sine and cosine mechanisms 86 and 88 respectively are commercially available components. They convert an input shaft rotation to a linear output shaft movement proportional to the sine and cosine respectively of the input shaft rotation. Thus, the outputs of the sine and cosine mechanisms are indicative of the sine and cosine of the ship's bearing (the angle between direction in which ship is pointed and north). The input shafts are shown at 96 and 98 and the output shafts at 100 and 102. Output shafts 100 and 102 lead to ball and disk integrators 104 and 106 respectively. These too are commercially available components and will be described in greater detail later.

The second inputs to the ball and disk integrators 104 and 106 are at rotatable input shafts 108 and 110. These are driven through gearing 112 from a motor 114. The motor produces a shaft rotation at a speed which is proportional to own ship's speed. The speed of motor 114 depends also on the range increment displayed on the indicator screen. Thus, for a given ship's speed, the greater the range increment displayed on the PPI indicator, the slower own ship's spot moves across the indicator screen and the slower the motor speed. The control circuit for the motor is shown at 116 and will be expalined in greater detail later.

The outputs of the ball and disk integrators 104 and 106 are shaft rotations at 118 and 120. Shafts 118 and 120 are connected through magnetically operated clutches 122 and 124 respectively to three different circuits. One includes the off-centering potentiometers 126 and 128. Potentiometer 126 produces an output voltage indicative of the y coordinate of own ship's position whereas potentiometer 128 produces an output which is indicative of the x coordinate of own ship's position. These voltages are applied to two coils, respectively, positioned at right angles to each other which comprise the off-centering coil or yoke 130. The voltages deflect own ship's mark across the indicator screen in accordance with the movement of own ship. In one practical system, the initial adjustment is such that when the output voltages of potentiometers 126 and 128 are zero, own ship's mark is at the center of the screen. Thus, the x and y coordinates on the screen are taken with respect to the center of the screen.

Reset potentiometers 132 and 134 are also driven by shafts 118 and 120. Their output voltages are applied to a reset relay as will be explained in greater detail later. The function of the reset potentiometers is to energize the reset relay when own ship's position has reached a preselected radius on the indicator screen. In brief, when this happens, the clutches 122 and 124 are de-energized and the clutches 136 and 138 are energized. Also, reset motor 140 is energized and it drives the gearing 142, which, in turn, drives the shafts 144 and 146 leading to the clutches 136 and 138. As a result, the gears 148 and 150 are driven as are the off-centering potentiometers 126 and 128. The latter produce voltages which reset own ship's position. Control circuits between the reset relay and other components are described later.

The third circuits driven by the shafts 118 and 120 through clutches 122 and 124 are the reset mechanisms 152 and 154. The function of these circuits is to reset own ship's position to a point such that if own ship continues to travel in the same direction after reset as before reset, it will pass through the center of the screen. The second input to the reset mechanism 152 and 154 respectively is from the sine and cosine mechanisms as indicated by the mechanical connections 156 and 158. These enable the reset mechanisms to sense the direction in which the ship was traveling before reset so that own ship's position can be reset in the manner indicated above.

In the discussion which follows, various ones of the circuits shown in FIG. 4 will be discussed in greater detail.

Ball and Disk Integrator

Figures 5, 6A, 6B, 7, 8C:
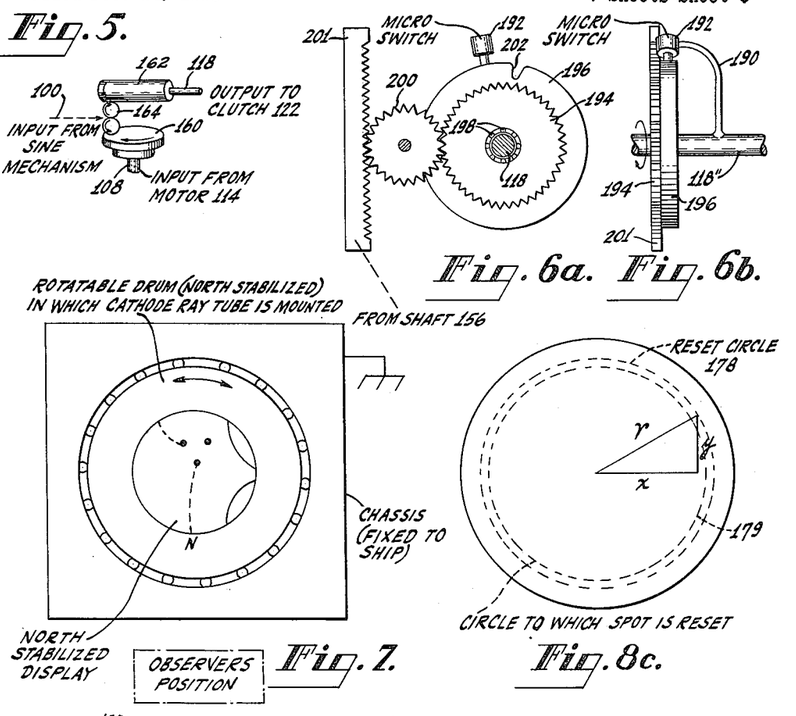

FIG. 5 should be referred to. Since ball and disk integrators 104 and 106 are identical, only the former will be described. The input shaft 108 is rotated by motor 114 through gear 112. Shaft 108 is connected to disk 160. The output shaft 118 which leads to clutch 122 is connected to a cylinder 162. Located between the cylinder and the disk are balls 164. The position of the balls determines the speed at which the cylinder 162 is driven. Thus, in the position shown in which the balls are at the edge of the disk 160, the cylinder is driven at relatively high speed. If the balls were at the center of the disk, the cylinder would remain stationary. This would correspond to own ship having a zero component of speed in the direction component sensed by the ball and disk integrator. (Note that one of the integrators senses the north-south or y component of ship's movement and the other the east-west of x component of ship's movement.) If the balls were at the opposite edge of the disk, the cylinder would be driven at maximum speed in the opposite direction. The position of the balls is determined by the linear position of shaft 100 from the sine mechanism.

Reset Circuit

Figure 8A:
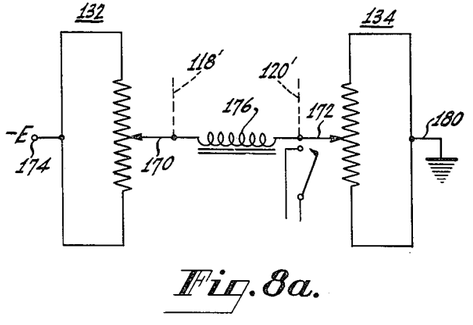
FIG. 8a is a schematic drawing of a circuit for sensing when own ship's position has reached the reset circle.

A circuit which senses when the mark indicative of own ship's position reaches the "reset circle" is shown in FIG. 8a. The reset circle is an imaginary ring near the edge of the screen and may have a radius about five-sixths that of the tube radius. It is shown by dashed lines 178 in FIG. 8c. The east-west or x reset potentiometer appears at 134 and the north-south or y reset potentiometer appears at 132. The sliders 170 and 172 of these potentiometers are driven by shafts 118′ and 120′ (see also FIG. 4). A source of voltage E is connected to terminal 174 and therefore appears at both ends of potentiometer 132. The two ends of potentiometer 134 are grounded. A relay coil 176 is connected between sliders 170 and 172.

Referring briefly to FIG. 8c, reset circle 178 has a locus with a constant distance $r$ from the center of the screen. By the Pythagorean theorem, $r^2 = x^2 + y^2$, where $x$ is the $x$ coordinate and $y$ is the $y$ coordinate of own spot's position when it reaches the reset circle. Thus, whenever the square of the $x$ axis deflection of own ship's spot from the center plus the square of the $y$ axis deflection of own ship's spot from the center equals the constant quantity $r^2$, the PPI sweep center (or own ship's position) must be on the reset circle.

Figure 8B:
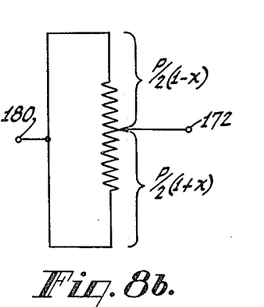

The reset circuit shown in FIG. 8a obtains voltages having components proportional to $x^2$ and $y^2$ and adds them. Relay 176 is actuated when the sum of the two squares is equal to $r^2$. This can be better understood from a consideration of the following:

Assume that the total resistance of potentiometer 132 equals the total resistance of potentiometer 134 equals P. Sliders 170 and 172 are initially set at the centers of their respective potentiometers. Potentiometer 134 is the one which is driven by the $x$ coordinate of own ship's position. When the spot is at the reset circle, slider 172 has been displaced from its center position a fraction $x$ of the distance from the center to the end of the potentiometer. This fraction is equal to the fraction of the radius represented by $x$ in FIG. 8c and therefore is identified by the same letter $x$. Assume that the displacement is in the up direction as indicated in FIG. 8b. The resistance represented by the fraction $x$ of the potentiometer's length is $$x\frac{P}{2}$$

Then the resistance above the slider is $$\frac{P}{2} - \frac{P}{2}x \quad \text{or} \quad \frac{P}{2}(1-x)$$

and the resistance below the slider is $$\frac{P}{2}(1+x)$$

The resistance between terminals 180 and 172 in FIG. 8b is then $$\frac{P}{4} - x^2\frac{P}{4}$$

This expression includes a constant term $P/4$ and a term $$x^2\frac{P}{4}$$

which varies as the square of the displacement $x$.

If $y$ represents the $y$ coordinate of the displacement of the spot which is at the reset circle, it can be shown in a similar way that the resistance of potentiometer 132 from terminal 174 to slider 170 is $$\frac{P}{4} - y^2\frac{P}{4}$$

Thus, there is a term $$y^2\frac{P}{4}$$

which varies as the square of the displacement $y$. The total resistance Z in the circuit at any time is $$\frac{P}{2} + R_{176} - x^2\frac{P}{4} - y^2\frac{P}{4} = Z$$

where $R_{176}$ is the resistance of relay 176. By Ohm's law, the current I through the circuit equals $E/Z$. Assuming that $r = 1$, then one point at which the relay should close is $x=1$ and $y=0$. At that time $$I = \frac{E}{\frac{P}{4} + R_{176}}$$

Therefore relay 176 can be reset if slider 172 is adjusted to one end of its potentiometer 134 ($x = 1$) and slider 170 is set in the center of its potentiometer 132 ($y = 0$). Under these conditions, the current I through the circuit is adjusted to a value just sufficient to close the relay. The above adjustment may simply be an adjustable resistor (220 in FIG. 9) placed across the relay coil (an adjustment of $R_{176}$) or in series with terminal 174 (an adjustment of E). When the relay current is set in this manner, any time own ship's spot reaches the reset circle, no matter where this occurs on the reset circle, the relay will close.

The circuit just described is covered in application Serial No. 782,935 by W. F. Turnow, filed December 24, 1958, concurrently with this application. While this is a preferred means for determining when own ship's mark reaches the reset circle, another one is possible. The operator may manually close a switch when he wishes to start the resetting operation. The remainder of the resetting operation is the same. In a practical radar system the manual reset feature is, in fact, included with the automatic one to permit resetting the mark whenever desired. It is a switch 177, 179 which is connected to energize relays 212 and 214 (see FIG. 9) when thrown.

Reset Mechanism

The immediately preceding paragraphs describe the circuit which senses when own ship's spot reaches the reset circle. FIGS. 6a and 6b show the automatic means which, after the reset relay has closed, returns own ship's spot to another preset radius on another side of the indicator screen. Since reset mechanisms 152 and 154 are identical, only one of them 152 is illustrated.

When the reset relay 176 (FIG. 8a) is closed, clutches 122 and 124 (FIG. 4) are de-energized and clutches 136 and 138 (FIG. 4) are energized. Details of the control circuits are given later. Reset motor 140 then rotates gear 148 through gearing 142 and now energized clutch 136 (FIG. 4). The gear 148 drives shafts 118', 118" and 118'''. Thus, the reset motor drives the rest mechanism 152, the off-centering potentiometer 126 and the reset potentiometer 132. A brief summary of what each circuit does is given several paragraphs below.

Returning now to the reset mechanism, the reader is referred to FIGS. 6a and 6b. Shaft 118" (the one driven by the reset motor 140 or the ball and disk integrator 104, depending on whether clutch 136 or 122 is energized) carries an arm 190 to which is fixed a microswitch 192. Also mounted on shaft 118" is a gear 194 to which is fixed a cam 196. The cam and gear are rotatable together about the shaft. Ball bearings are shown at 198. Gear 194 meshes with the pinion 200 which is driven by the sine shaft 156. The conversion from the linear movement of shaft 156 to rotational movement may be via conventional means such as a gear rack which meshes with pinion 200, as indicated schematically at 201.

The shaft 156, it should be recalled, is controlled by the gyro operated motor 40 (FIG. 4). Thus, the position of the notch 202 in cam 200 at any instant is indicative of the $y$ or north-south component of the ship's bearing at that instant. In particular, the position of the notch at the instant own ship's mark is on the reset circle is such as to give reciprocal movement during resetting. The initial phasing between the gyro operated motor and the cam is such that when own ship's mark is on the reset circle the amount the microswitch 192 must be driven until it falls into the notch corresponds to the driving of the off-centering potentiometer 126

(FIG. 4) an amount sufficient to reset the mark to a preselected point near an edge of the indicator screen such that if own ship continues to travel in the same direction, the mark will pass through the center of the screen.

Note also that the initial phasing is such that the microswitch will be in the notch if the direction component is zero. In the case illustrated in FIGS. 6a and 6b, the microswitch of reset mechanism 152 will be in the notch if the ship continues on a steady course after reset and is headed east or west; in which case the north-south or y component of movement is zero. Likewise as to reset mechanism 154, the microswitch will be in the associated notch if the ship continues on a steady course after reset and is headed north or south, the x component of movement then being zero.

It will be explained in detail later that switch 192 is a single pole, double-throw switch. When the switch rides on the cam it is in one position and when it falls into the notch 202, it is in its other position. Referring briefly to FIG. 4, when the microswitch is driven into the notch, clutch 136 becomes de-energized so that motor 140 can no longer drive the off-centering potentiometer and reset potentiometers, and clutch 122 is re-energized.

A brief summary of the entire reset operation is now given. FIG. 4 should be referred to. Shafts 118 and 120 rotate at speeds which depend upon own ship's speed, the range displayed on the radar screen, and own ship's heading. Clutches 122 and 124 are normally energized so that shaft 118 normally drives reset mechanism 152, off-centering potentiometer 126, and reset potentiometer 132, and shaft 120 rotates the corresponding three x coordinate circuits. The output voltages of off-centering potentiometers 126 and 128 move the mark indicative of own ship's position across the radar screen. They continue to move the mark until it reaches the reset circle. The reset potentiometers 132 and 134 are also driven along with the off-centering potentiometers. These reset potentiometers produce output voltages having terms proportional to $x^2$ and $y^2$, respectively. When own ship's mark is on the reset circle, $x^2+y^2=r^2$, where $r$ is the radius of the reset circle, and the reset relay is thrown.

The reset mechanisms 152 and 154 are also driven along with the off-centering potentiometers. These mechanisms have inputs to produce reciprocal movement of the mark during reset.

When the reset relay 176 (see FIG. 9) is thrown, motor 224 (FIG. 9) starts. Cam 228 closes relay 212 which starts reset motor 140. Assuming that neither the microswitch of reset mechanism 152 or reset mechanism 154 is in the notch in the cam associated with that switch, (the normal case) clutches 122 and 124 are de-energized and clutches 136 and 138 are energized. (The retails of the control circuit are given later.) Thus, the reset motor 140 drives through clutch 136, the reset mechanism 152, the off-centering potentiometer 126 and the reset potentiometer 132, and through clutch 138 the corresponding three x coordinate circuits. The off-centering potentiometers 126 and 134 move the mark to a new position on the screen. When the reset position is reached that is, a place on the screen in a direction from the screen center 180° displaced from the ship's heading at the time it reaches the reset circle, the reset mechanisms 152 and 154 de-energize clutches 136 and 138, energize clutches 124 and 128, and stop motor 140. Also, the reset relay opens since the distance from the center of the screen to the reset position is adjusted to be slightly less than the reset radius $r$. This is done to prevent premature tripping of the reset circuit shortly after resetting.

Figure 12A:
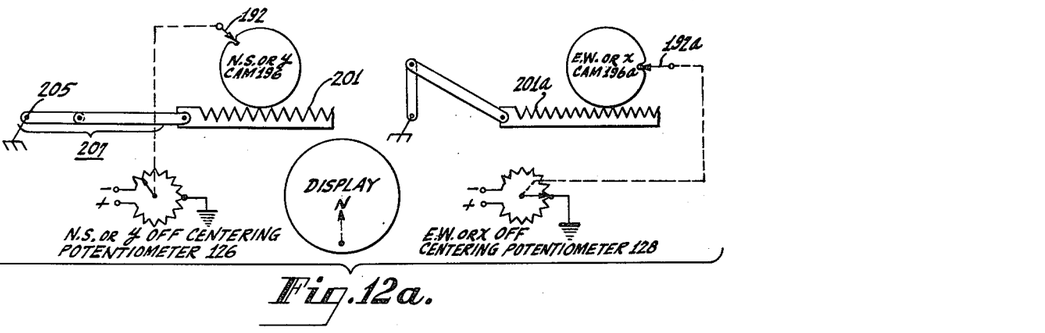
FIGS. 12a–12f are sketches showing the manner in which the off-centering potentiometers and reset mechanisms are driven as own ship's mark moves across the radar screen.

The point to which the mark is reset is a function of the ratio between the cam rotation and the off-centering potentiometer rotation (see FIG. 12a). The reset point can be shifted to a minor extent by changing the voltage applied to the off-centering potentiometer. Also, the reset circle 178 (FIG. 8c) can be adjusted with respect to the circle to which the spot is reset (179 in FIG. 8c) by adjusting the sensitivity of relay 176 and the adjusting resistor 220 (both in FIG. 9). In practice, the above adjustments are service adjustment and, once made, remain set. As already mentioned, the adjustments are such that $r$, the radius of the reset circle 178, is slightly larger than the radius of the circle 179 to which the spot is reset.

A specific example of the operation of the system described above is illustrated in FIGS. 12a–12f. Each of the figures shows the cams 196 and 196a of the two reset mechanisms, their associated microswitches 192 and 192a, the north-south and east-west off-centering potentiometers 126 and 128, and the indicator screen.

The gear 194 of each cam is driven by a gear rack (see FIG. 6a). For the purpose of drawing simplicity, the gear 194 is not shown in FIGS. 12a–f. The conversion from rotational movement of shaft 205 to longitudinal movement of the gear rack is via a crank arm assembly 207. The shaft 205 can be thought of as an extension of shaft 96 (FIG. 4). The crank arm assembly 207 is a schematic representation of the sine-cosine mechanism 86 (FIG. 4). The gearing is such that a 90° turn of own ship corresponds to 120° rotation of a cam. The off-centering potentiometers 126 and 128 are directly connected to the microswitches. The north-south and east-west off-centering potentiometer cover 350° each. 120° of movement of a microswitch around its cam surface corresponds to 120° of potentiometer slider movement.

For the present, consider the indicator screen to be a conventional north-stabilized screen. North therefore is in the up direction. Own ship is proceeding north. It has just been reset to the south portion of the screen. Since the mark is at the center bottom of the screen, the east-west deflection voltage is zero. Note that the slider of potentiometer 128 is at ground. The bottom of the indicator screen corresponds to a negative north-south or y off-centering voltage. Note that the slider of potentiometer 126 is at a negative voltage. Since the mark has just been reset, both microswitches 192 and 194 are in their respective notches. The notch of cam 196 is in the "south edge reset" position. In other words, if the ship's direction does not change, the next time the mark is reset it will be reset to the south edge of the screen. The same holds for cam 196a.

Figure 12B:
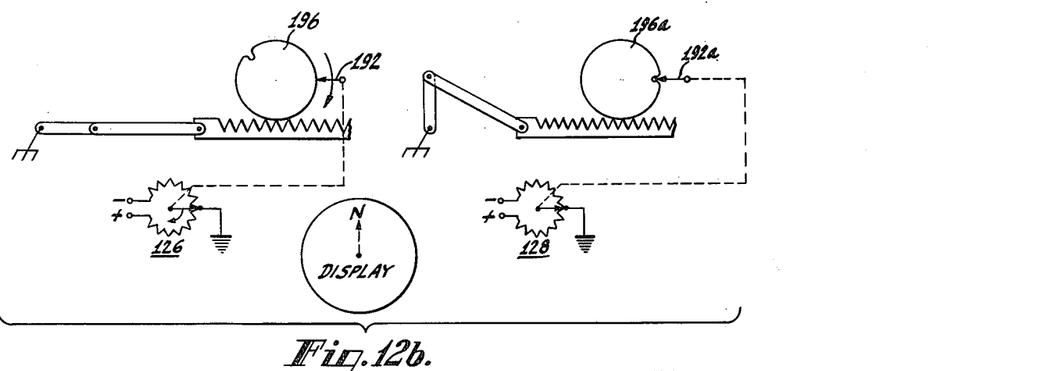

In FIG. 12b, own ship is still proceeding north and has reached the center of the screen. Since the east-west component of movement remains zero, microswitch 192a remains in the same position in FIGS. 12a and 12b and the slider of potentiometer 128 also remains in the same position. However, microswitch 192 has moved clockwise out of the notch and around approximately 120° of the cam surface. This corresponds to the movement of the slider of potentiometer 126 from a negative voltage corresponding to a point on the reset circle to zero volts (120° of movement). This is correct since when own ship's mark is at the center of the screen, the north-south or y deflection voltage is zero as is the east-west deflection voltage.

Figure 12C:
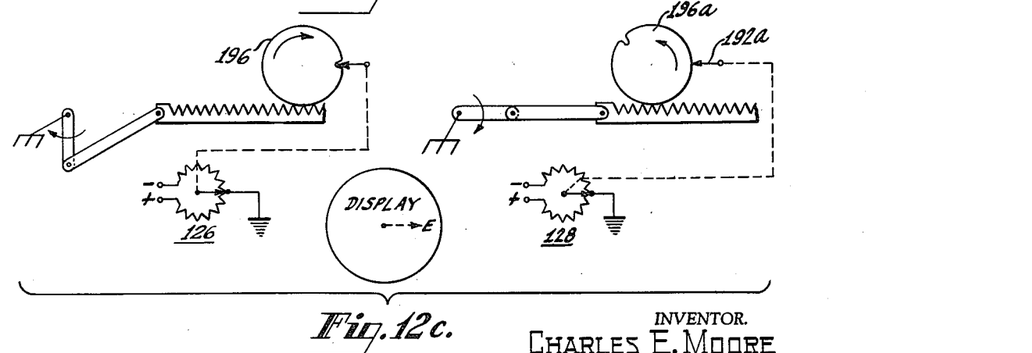

In FIG. 12c own ship's mark is still at the center of the screen but the ship has turned 90° to the right and is now heading east. Since the mark is still at the center of the screen, that is, the ship has not moved substantially in the forward direction but has only turned, all sliders and microswitches remain in the same position. However, the cams 196 and 196a each turn 120°.

Figure 12D:
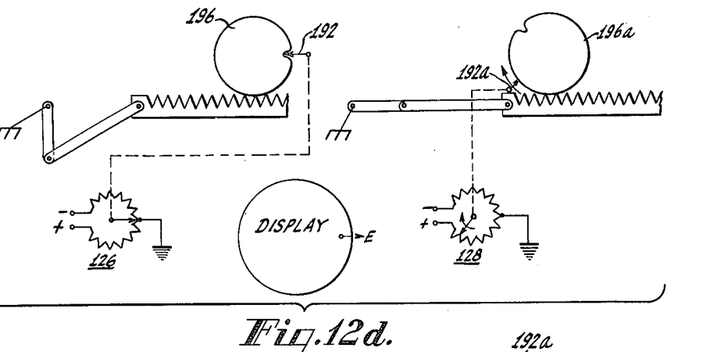

In FIG. 12d own ship has continued to travel east and own ship's mark is now close to the east edge of the screen and ready to be reset. The eastward movement of the mark causes the clockwise movement of microswitch 192a and the corrresponding clockwise movement of the slider of east-west potentiometer 128. The latter now picks off a positive voltage which corresponds to the deflection of the mark to the reset circle and near the east edge of the screen. Since the north-south component of movement is zero, the slider of potentiometer 126 does not move nor does the microswitch 192. When the mark is in the position shown in FIG. 12d, it is on the reset circle and the reset mechanism is thrown.

Figure 12E:
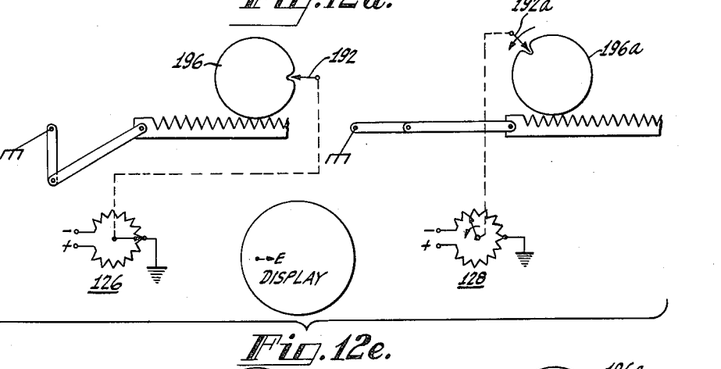

FIG. 12e illustrates what happens at reset. The mark is shown at the reset position and this is about 11/16 of the screen radius toward the west edge of the screen. The ship is continuing to travel east. The reset mechanism has driven microswitch 192a counter-clockwise along the surface of cam 196a until it has fallen into the notch (approximately 266° of movement). It will be recalled that this inactivates the clutch between the reset motor and the shaft on which the microswitch is mounted. The slider of potentiometer 128 has been driven along with the microswitch from a positive voltage (which corresponds to a point on the reset circle near the east edge of the screen) to a negative voltage (which corresponds to a point on the circle to which the mark is reset near the west edge of the screen)—a total of approximately 266° of counter-clockwise movement. Microswitch 192 was already in the notch of cam 196 when own ship's mark was on the reset circle. Accordingly, during the resetting operation microswitch 192 is not driven nor is the slider of north-south potentiometer 126. This is correct since at the center of the west edge of the screen, the y or north-south component of voltage is zero.

Figure 12F:
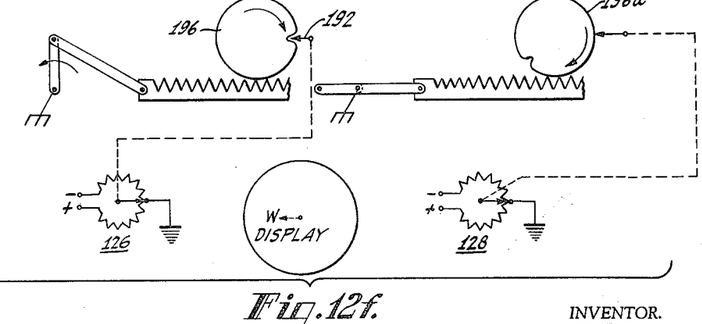

FIG. 12f illustrates what would have happened if the ship had turned west (left) after it had reached the center of the screen. In other words, FIG. 12f follows 12b. The left turn corresponds to a clockwise rotation of cam 196 through 120° and a clockwise rotation of cam 196a through 120°. The notch in cam 196a now faces the east reset position. This means if own ship continues to travel west until own ship's mark hits the west point on the reset circle, own ship's mark will be reset to the east part of the screen.

The operation of the system with the relative-bearing north-stabilized display shown in FIGS. 2a–2d is exactly the same as that illustrated in FIGS. 12a–12f. However, when the ship turns, the drum in which the cathode ray tube is mounted also turns so that, for example, when the ship turns east as shown in FIG. 12c, the dashed arrow will point to the top of the screen. As a matter of fact, one's own mark always travels toward the upper center of the screen with the display of the present invention and the reset position is always toward the bottom center of the screen.

In FIG. 4, shafts 118', 118" and 118''' are shown schematically as separate shafts. In practice, a common shaft is used for the three circuits.

*Relays and Control Circuits*

Figure 9:
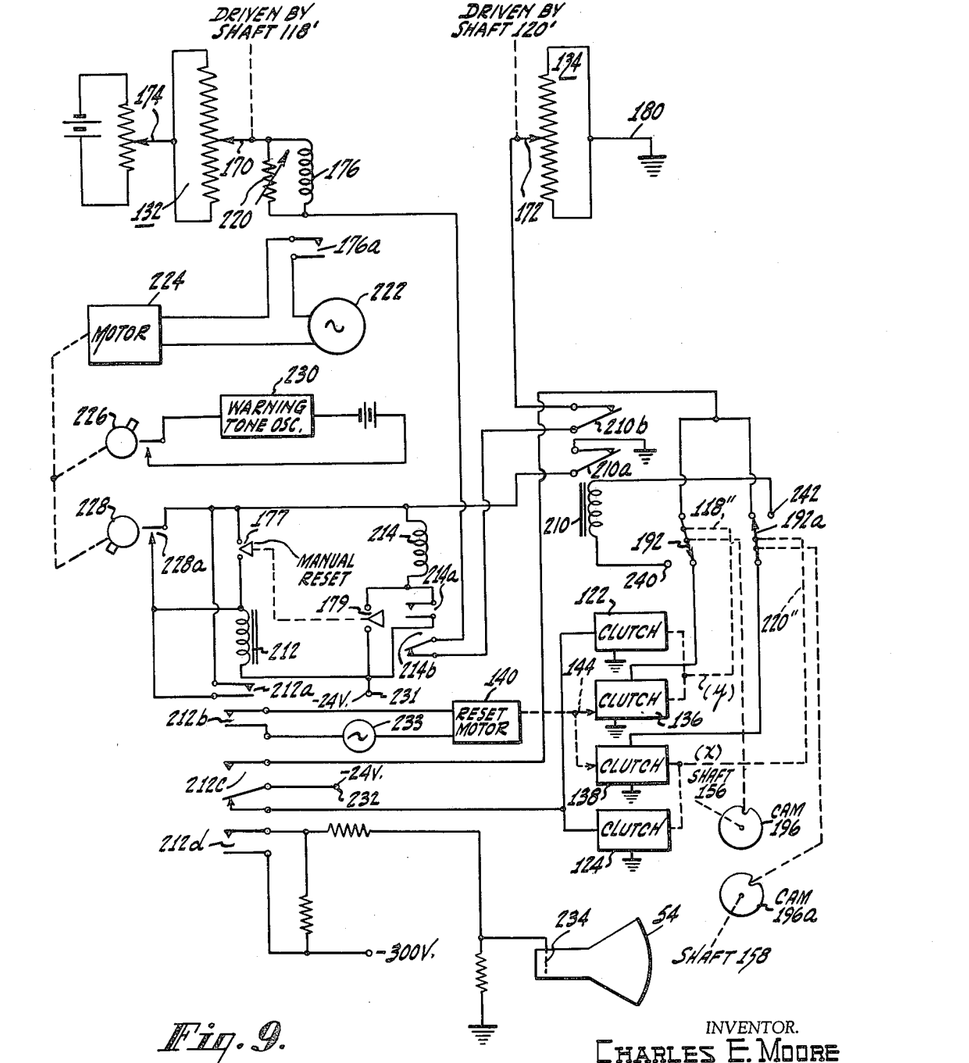
FIG. 9 is a schematic circuit diagram of various control circuits for the system of the present invention.

FIG. 9 shows various relays and control circuits for the system. The circuit for sensing when own ship's spot reaches the reset circle has already been explained. In addition to the parts shown in FIG. 8a, there is shown an adjustable resistor 220 placed across the relay coil 176 and normally closed relay contacts 210b and 214b in series with the relay coil. When own ship's spot reaches the reset circle, relay 176 is energized and contacts 176a close. Contacts 176a are in series with the alternating current power source 222 and motor 224. Thus, power is applied to motor 224 and it rotates cams 226 and 228. Cam 226 actuates a warning tone oscillator 230. The oscillator remains on for four seconds and this warns the radar operator that the display is about to be reset. After a shoft period, 30 seconds for example, cam 228 closes contacts 228a and relay 212 is energized. The power circuit for this relay extends from terminal 231 through the relay, through contacts 228a, through the closed contacts 210a to ground. Contacts 212a are holding contacts which maintain relay 212 energized after contacts 228a open.

Contacts 212b of relay 212, when closed, complete the power circuit to reset motor 140. The circuit is from alternating current source 233 through contacts 212b to the motor. The reset motor 140 is connected through gearing 142 (shown in FIG. 4 but not in FIG. 9) to clutches 136 and 138. These clutches are normally open. Clutch 136 leads to the y coordinate shaft and clutch 138 to the x coordinate shaft.

Contacts 212c of relay 212 disconnect power from normally energized clutches 122 and 124 and connect the power instead to clutches 136 and 138. The circuit to the latter clutches is from terminal 232, through the upper contacts of 212c, through microswitches 192 and 192a to the respective clutches 136 and 138. Therefore, reset motor 140 now drives the reset and off-centering potentiometers and the reset mechanism through now energized clutches 136 and 138.

Contacts 212d of relay 212 apply a negative bias voltage to the control grid 234 of the cathode ray tube indicator 54, thereby blanking the cathode ray tube during reset. This prevents smearing during the resetting operation.

The reset motor 140 rotates shafts 118" and 120" (see also FIGS. 6a and b) and thereby moves microswitches 192 and 192a around the surface of their respective cams 196 and 196a. When the microswitches 192 and 192a fall into the respective notches on their cams, they move to positions 240 and 242, respectively. This applies power to relay 210. The power circuit to the relay is from terminal 232, through the upper contacts 212c, through contact 240, through relay 210, through contact 242, through clutch 138 to ground.

When relay 210 is energized, normally closed contacts 210a and 210b open. Contacts 210b are in series with relay 176 so that the circuit for sensing when own ship's spot reaches the reset circle is open. This prevents premature resetting. Contacts 210a are in series with relay 212 so that relay 212 is de-energized and all of its contacts assume their normal positions. Thus, the reset motor 140 stops and the blanking is removed from the oscilloscope. The picture which now appears on the display is similar to the one of FIG. 2a (or FIG. 1a if the radar system were a true-bearing, true-motion system) with own ship's spot near one edge of the screen and traveling toward the center of the screen. The reset motor 140 has driven the off-centering potentiometers 126 and 128 (FIG. 4), the reset potentiometers 132 and 134 and the reset mechanisms 152 and 154 (see FIG. 4) through clutches 136 and 138. Thus, all circuits have been reset and own ship's spot can move from near one edge of the indicator screen toward the opposite edge.

*Motor Control Circuit*

Figures 10, 11:
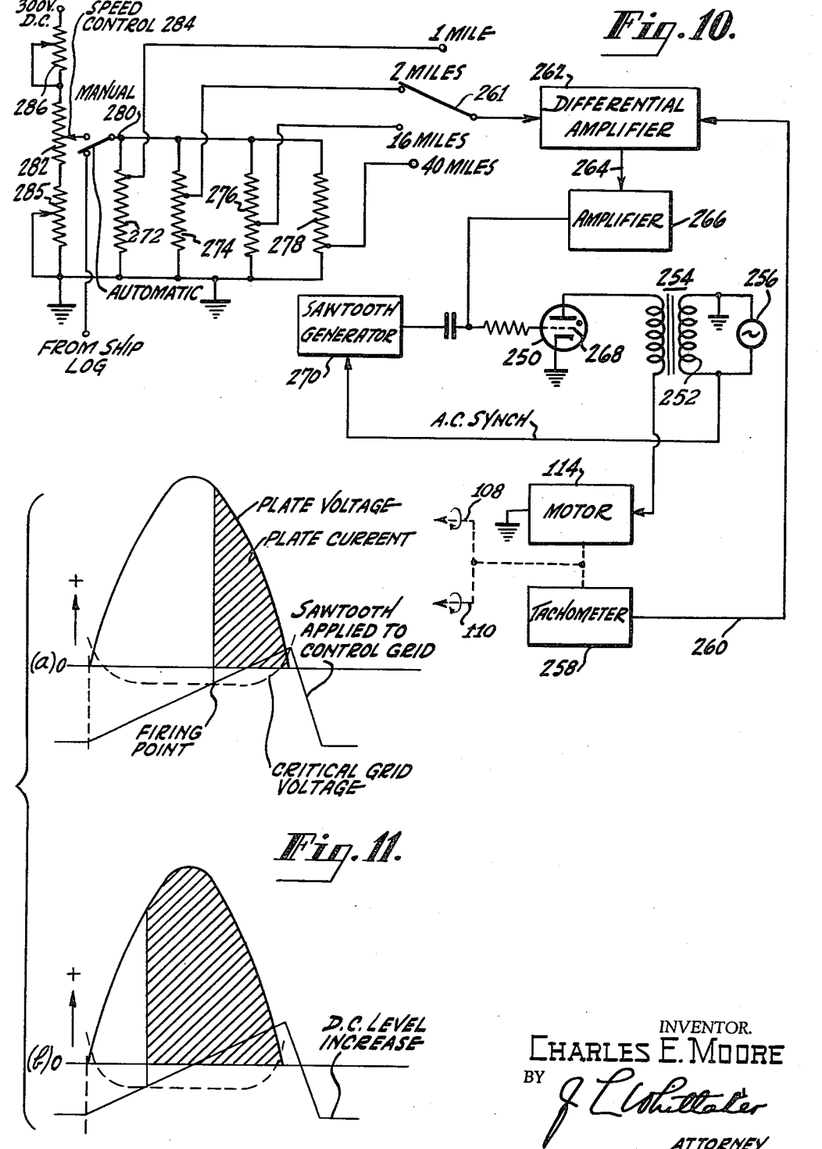
FIG. 10 is a block and schematic circuit diagram of a motor control circuit for the system of the present invention.
FIG. 11 is a drawing of waveforms present in the circuit of FIG. 10.

The motor control circuit is shown in block and schematic diagram form in FIG. 10. The motor 114 is the one which drives the shafts 108 and 110 which, in turn, drive the ball and disk integrators 104 and 106 (FIG. 4). It is in series with the anode-to-cathode circuit of a thyratron 250, and the secondary winding 252 of the transformer 254. Although shown in the anode circuit, it is to be appreciated that the motor may instead be connected to the cathode. The transformer is driven by an alternating current (sine wave) source 256. Whenever the plate of the thyratron is driven positive, the thyratron draws current, provided that the voltage applied to the control grid 208 is above a critical value.

Motor 114 drives a tachometer 258 which produces a D.C. output voltage at lead 260. The D.C. output voltage is applied to one of the input circuits to a differential amplifier 262. The second input to the differential amplifier consists of a D.C. voltage selected by the motor selection switch 261. The differential amplifier compares its two input voltages and, when they become equal, produces a stable D.C. voltage output at lead 264. This voltage is amplified in stage 266 and applied as a D.C. bias to the control grid 268 of the thyratron.

Whether or not the thyratron 250 conducts, depends upon the grid voltage of the thyratron at the time the thyratron plate is driven positive. The grid voltage of the thyratron during the time the thyratron plate is driven positive, in turn, depends upon the D.C. voltage applied to the grid and the sawtooth voltage from stage 270 superimposed on the D.C. voltage. The sawtooth generator is synchronized by the same A.C. signal as the one producing the A.C. plate voltage for the thyratron. Accordingly, the D.C. voltage applied to the control grid determines the point in time at which the thyratron starts conducting and thus the amount of current conducted by the thyratron during each conducting interval.

In a typical operation, after speed selection switch is moved to a point such that a higher value of D.C. voltage is applied to the differential amplifier, a lower value of D.C. voltage appears at lead 264 and a higher value of D.C. voltage is applied by amplifier 266 to the control grid 268. This corresponds, for example, to placing the switch 261 in the one mile range. When the D.C. level of the voltage applied to the control grid is increased, the thyratron conducts more current during its condition intervals, the motor speeds up, and the tachometer output voltage increases to a point at which it equals the voltage selected by the speed selection switch. At that time the direct voltage at lead 264 stabilizes at a constant value and the motor speed is constant.

The relationship between the various waveforms discussed above is shown in FIGS. 11a and b. The sine and sawtooth waves are in phase. As can be seen from FIG. 11b, as the D.C. level of the sawtooth is increased (the voltage applied from amplifier 266 to the control grid of the thyrarton 250 is made more positive), the amount of current conducted is increased. It is possible with this circuit to control the current over almost 180° of the sine wave, whereas if inphase sine waves were applied to the control grid and plate, the range of control would be about 90°.

Referring again briefly to FIG. 10, the arrangement of resistors at the left of the figure is to enable the motor to operate at different speeds. The resistors 272, 274, 276, and 278 may be of different values. However, the taps are so arranged that the one mile pin of switch 261 has the highest voltage applied to it and the 40 mile pin the lowest.

Two modes of operation are possible. One is manual and the other automatic. The switch which permits the selection of either mode is shown at 280 (FIG. 10). In the automatic mode of operation, a D.C. voltage from the ship's log or shaft r.p.m. indicator is applied to the resistor bank 272, 274, 276, 278. In the manual mode, the D.C. voltage is applied from the voltage divider arrangement 282. (Resistors 285 and 286 are for speed calibration.) Adjustments of motor speed and thereby of the speed at which own ship's spot moves across the face of the indicator screen may be made by the speed control potentiometer 284.

*Manual Adjustment*

In operating the system described above, the speed of movement of own ship's spot across the indicator screen should be such that all fixed targets remain fixed and all moving targets move. Smearing in a direction parallel to that in which own ship is traveling indicates that own ship's spot is not moving across the indicator screen at the correct speed. This type of smearing can be eliminated by adjustment of speed control potentiometer 284. The operator simply adjusts the value of this potentiometer until smearing of fixed targets is no longer observed.

*Drift Angle Correction*

It sometimes happens that winds or currents are such that the actual direction of movement of the ship over the bottom (ground track) is different than the direction in which the ship is heading. Under these circumstances, fixed targets smear in a direction perpendicular to own ship's movement. This type of smearing can be eliminated by hand control 92 shown in FIG. 4. It adjusts a mechanical differential which effectively changes the phase between output shafts 96, 98 and input shaft 84. In operation, the control is merely adjusted to a point at which the sideways smearing is eliminated.

It is important for the pilot to know the amount of drift. This may be indicated on drift indicator 94. The latter may simply be a voltmeter or the like connected to the slider of a potentiometer. The potentiometer, in turn, is connected across a source of A.C. or D.C. voltage, depending on the type of meter movement. The slider of the potentiometer is driven from hand wheel 92 via mechanical connection 290. The initial adjustment is such that when the ground track direction is the same as the ship's heading, the reading on the drift indicator is zero.

*Console*

A top view of the radar console is shown in FIG. 7. The tube and associated components are mounted in a rotatable drum. The latter is driven by the gyro-controlled servo system. The picture is north-stabilized which eliminates smearing yet one's own movement is always up giving a relative presentation. Bearings may be taken relative to one's heading or relative to true north.

What is claimed is:

1. In a true-motion radar system for a moving vehicle, means responsive to the vehicle's speed and bearing for producing deflecting voltages indicative of the vehicle's $x$ and $y$ spatial coordinates; an indicator responsive to the deflecting voltages for displaying on its screen targets in an area scanned by the radar system and a mark indicative of own vehicle's position with respect to said targets; means for applying said deflecting voltages to said indicator for moving said mark at a speed and in a direction corresponding to the speed and direction of own vehicle; means for sensing when said mark reaches a predetermined distance from the center of said screen; and means controlled by said sensing means for changing said deflecting voltages in a sense and amount to reset said mark to another place on said screen at which, if own vehicle continues to travel in the same direction, the mark passes through the center of said screen.

2. In a true-motion radar system for a moving vehicle, means responsive to the vehicle's speed and bearing for producing deflecting voltages indicative of the vehicle's $x$ and $y$ spatial coordinates; an indicator responsive to the deflecting voltages for displaying on its screen targets in an area scanned by the radar system and a mark indicative of own vehicle's position with respect to said targets; means for applying said deflecting voltages to said indicator for moving said mark at a speed and in a direction corresponding to the speed and direction of own vehicle; means for sensing when said mark reaches a predetermined distance from the center of said screen; and means responsive to the ship's bearing and controlled by said sensing means for changing said deflecting voltages in a sense and amount to reset said mark to another place on said screen at which, if own vehicle continues to travel in the same direction, the mark passes through the center of said screen.

3. In a true-motion radar system for a moving vehicle, said system including an antenna having a rotatable directive pattern, means responsive to the vehicle's speed and bearing for producing deflection voltages indicative of the vehicle's $x$ and $y$ spatial coordinates, said means including off-centering deflection means; an indicator and radial deflection means therefor for displaying on a persistent screen targets in an area scanned by the radar system and a mark indicative of own vehicle's position with respect to said targets; means for stabilizing in azimuth said screen and said off-centering means; means for applying said deflection voltages to said indicator for moving said mark at a speed and in a direction corresponding to the speed and heading of own vehicle; means for altering said deflection voltages in accordance with the difference between own vehicle's heading and ground track; and means for maintaining said directive pattern and the radial deflection produced by said radial deflection means in fixed phase relation regardless of the direction in which said vehicle is moving.

4. In a true-motion radar system for a moving vehicle, in combination, a directional reference; drive means controlled by said directional reference for producing rotation of a first shaft; resolver means for moving a second shaft an amount proportional to the sine of the angle of rotation of the first shaft and for moving a third shaft an amount proportional to the cosine of said angle; second drive means for rotating a fourth shaft at a speed proportional to the speed of said vehicle; means responsive to the rotation of the fourth shaft and the movement of the second shaft for producing a deflection voltage indicative of the $y$ coordinate of own vehicle's position; means responsive to the rotation of the fourth shaft and the movement of the third shaft for producing a deflection voltage indicative of the $x$ coordinate of own vehicle's position; and an indicator to which said voltages are applied for indicating own ship's motion.

5. In a true-motion radar system for a moving vehicle, in combination, a directional reference; drive means controlled by said directional reference for producing rotation of a first shaft; resolver means for linearly moving a second shaft an amount proportional to the sine of the angle of rotation of the first shaft and for linearly moving a third shaft an amount proportional to the cosine of said angle; second drive means for rotating a fourth shaft at a speed proportional to the speed of said vehicle; a ball and disk integrator responsive to the rotation of the fourth shaft and the movement of the second shaft for producing a deflection voltage indicative of the $y$ coordinate of own vehicle's position; a ball and disk integrator responsive to the rotation of the fourth shaft and the movement of the third shaft for producing a deflection voltage indicative of the $x$ coordinate of own vehicle's position; and an indicator to which said voltages are applied for indicating own vehicle's motion.

6. In a true-motion radar system, a display which includes a mark indicative of own vehicle's position; means for producing a shaft rotation through an angle proportional to a Cartesian coordinate of own vehicle's position; a normally energized first clutch; an adjustable deflection voltage source for said display driven by said shaft through said clutch; drive means; a normally inactive second clutch interconnecting said drive means with said adjustable deflection voltage source; and means responsive to movement of said mark beyond a predetermined distance from the center of said display for energizing said second clutch and inactivating said first clutch, whereby said drive means may reset said adjustable deflection voltage through said second clutch.

7. In a true-motion radar system, a display which includes a mark indicative of own vehicle's position and to which $x$ and $y$ deflection voltages may be applied for moving said mark at a speed and in a direction corresponding to the movement of the vehicle on which the radar system is located; means for rotating a first shaft through an angle proportional to the $x$ coordinate of own vehicle's position; means for rotating a second shaft through an angle proportional to the $y$ coordinate of own vehicle's position; a pair of normally energized first clutches; an adjustable $x$ deflection voltage source for said display driven by said first shaft through one of said first clutches; an adjustable $y$ deflection voltage source for said display driven by said second shaft through the other of said first clutches; drive means; a pair of normally inactive second clutches interconnecting said drive means with said $x$ and $y$ deflection voltage sources respectively; and means responsive to movement of said mark beyond a predetermined distance from the center of said display for energizing said pair of second clutches and inactivating said pair of first clutches, whereby said drive means can reset said $x$ and $y$ deflection voltages to thereby reset said mark to a new position on said display.

8. In a true-motion radar system for a moving vehicle, a cathode ray tube which includes means for producing a focused electron beam, and an off-centering coil to which a deflection voltage may be applied for deflecting said beam; means for producing a shaft rotation through an angle proportional to a Cartesian coordinate of own vehicle's position; a normally energized first clutch; an adjustable deflection voltage source connected to said coil and driven by said shaft through said clutch; drive means; a normally inactive second clutch interconnecting said drive means with said adjustable deflection voltage source; and means responsive to deflection of said electron beam through greater than a predetermined angle for energizing said second clutch and inactivating said first clutch, whereby said drive means may reset said adjustable deflection voltage through said second clutch.

9. In a true-motion radar system, a mechanism for resetting the mark on the display indicative of own vehicle's position comprising, in combination, a shaft which rotates through an angle proportional to one coordinate of ship's position; a cam rotatably mounted on said shaft so that it is rotatable relative to said shaft; a switch fixed to said shaft and engaged with a surface of said cam, said cam including means for operating said switch; a reset motor connected to said switch and energized when the latter is operated by said cam; and a deflection voltage source which controls one coordinate of the position of said mark on said display connected to and driven by said reset motor when said switch is operated by said cam.

10. In a relative-bearing, true-motion radar system, a display device including a screen, means for producing on said screen a display which includes a mark indicative of own ship's position, said means also including means for causing said mark to move on said screen from a starting position in accordance with the travel of own ship so that the position of said mark is representative of own ship's position, means for holding said screen and said mark stationary in inertial space so far as rotation is concerned, and means for resetting said mark in response to said mark reaching a position close to an edge of said screen.

11. A true-motion radar system to be borne by a mobile craft, said system comprising means for producing in polar coordinates a display on a display screen for showing own craft's position and the positions of objects in the vicinity of own craft, own craft's position being indicated by a mark on said display, means for positioning said mark near the boundary of said display, means for causing said mark to move on said display in accordance with the travel of said craft so that the position of said mark is representative of own craft's position, means for holding said display screen and said mark stationary in inertial space so far as rotation is concerned, means for sensing when said mark reaches a predetermined distance from the center of said screen, and means controlled by said sensing means for changing the position of said mark in a sense and amount to reset said mark to another place on said screen at which, if said craft continues to travel in the same direction, the mark passes through the center of the screen.

12. A relative-bearing, true-motion radar system to be borne by a mobile craft, said system comprising, a cathode ray tube having a screen, means for producing in polar coordinates a display on said screen for producing a reference point indication showing own craft's position and other indications showing the positions of objects in the vicinity of own craft, off-centering deflection means for positioning on said screen the reference point indication showing own craft's position, said off-centering means including means for deflecting the cathode ray of said tube simultaneously in two directions to positions that may be represented by $x$ and $y$ coordinates, means for holding said screen and said reference point indication stationary in inertial space so far as rotation is concerned, and means including said off-centering means for causing said reference point indication on said screen in accordance with the travel of said craft so that the position of said reference point is always representative of own craft's position, and means for adjusting the deflection produced by said off-centering means in accordance with the difference between said craft's heading and ground track so as to avoid smearing on said screen due to said difference.

References Cited in the file of this patent

UNITED STATES PATENTS

| | | |
|---|---|---|
| 2,589,584 | Thompson | Mar. 18, 1952 |
| 2,697,827 | Whitaker | Dec. 21, 1954 |
| 2,701,352 | Kingdon et al. | Feb. 1, 1955 |
| 2,752,091 | McKenney | June 26, 1956 |
| 2,869,027 | Harrison | Jan. 13, 1959 |